(12) United States Patent
Ferraresi (10) Patent No.: US 8,910,814 B2
(45) Date of Patent: Dec. 16, 2014

(54) SAFETY DEVICE FOR CONTAINERS HOLDING FLUID UNDER PRESSURE

(76) Inventor: Vittorio Ferraresi, Como (IT)

( * ) Notice: Subject to any disclaimer, the term of this patent is extended or adjusted under 35 U.S.C. 154(b) by 0 days.

(21) Appl. No.: 13/416,215

(22) Filed: Mar. 9, 2012

(65) Prior Publication Data

US 2013/0233856 A1  Sep. 12, 2013

(51) Int. Cl.
*B65D 51/16* (2006.01)

(52) U.S. Cl.
USPC ............ 220/203.04; 220/203.05; 220/203.06; 220/203.07; 220/324; 285/312; 285/420

(58) Field of Classification Search
USPC ............... 220/203.04–203.07, 324–328, 686; 285/38, 312, 363–366, 410, 420, 901
See application file for complete search history.

(56) References Cited

U.S. PATENT DOCUMENTS

| | | | | |
|---|---|---|---|---|
| 1,439,000 A * | 12/1922 | Jacobs | ........................... | 220/325 |
| 1,473,408 A * | 11/1923 | Richardson et al. | .......... | 220/231 |
| 1,501,203 A * | 7/1924 | Crossley | .................. | 292/256.69 |
| 1,508,817 A * | 9/1924 | Pfaehler et al. | .......... | 220/203.04 |
| 1,894,280 A * | 1/1933 | Nelson | ........................... | 292/256.67 |
| 2,195,132 A * | 3/1940 | Nelson | ........................... | 220/325 |
| 2,335,309 A * | 11/1943 | Pfleumer | ...................... | 220/251 |
| 2,743,034 A * | 4/1956 | Wheatley | ...................... | 220/327 |
| 2,801,764 A * | 8/1957 | Russell et al. | ................. | 220/320 |
| 2,869,752 A * | 1/1959 | Hall | .............................. | 220/298 |
| 3,029,724 A * | 4/1962 | Lee | ................................. | 99/352 |
| 3,458,083 A * | 7/1969 | Erwin, Jr | ...................... | 220/316 |
| 3,498,493 A * | 3/1970 | Kemp | ........................... | 220/325 |
| 3,817,564 A * | 6/1974 | Baldwin et al. | .......... | 292/256.67 |
| 4,135,640 A | 1/1979 | Macquilkin et al. | | |
| 4,173,364 A * | 11/1979 | Hein | ........................ | 292/256.67 |
| 4,219,125 A * | 8/1980 | Wiltshire et al. | ............ | 220/4.13 |
| 4,267,940 A * | 5/1981 | Wade | ............................ | 220/321 |
| 4,288,001 A * | 9/1981 | Lankston | ...................... | 220/316 |
| 4,379,513 A * | 4/1983 | Basterfield et al. | ........... | 220/325 |
| 4,711,366 A * | 12/1987 | Chen | ............................. | 220/316 |
| 5,960,980 A * | 10/1999 | Burke et al. | .................. | 220/325 |
| 6,003,548 A * | 12/1999 | Muchow | ................. | 137/614.05 |
| 6,007,120 A * | 12/1999 | Vogt et al. | ................ | 292/256.69 |
| 6,019,029 A * | 2/2000 | Chan | .............................. | 99/337 |

(Continued)

FOREIGN PATENT DOCUMENTS

| | | |
|---|---|---|
| DE | 33 12 786 A1 | 10/1984 |
| GB | 1 253 359 A | 11/1971 |
| GB | 1 367 860 A | 9/1974 |

*Primary Examiner* — Mickey Yu
*Assistant Examiner* — Brijesh V. Patel
(74) *Attorney, Agent, or Firm* — R. Ruschena Patent Agent, LLC (57) ABSTRACT

The safety device (1) for containers includes at least two units (3) to be engaged with each other so as to define an inner volume adapted to receive the fluid under pressure, the safety device (1) comprising a closing system (4) defining a closed position in which the components (3) are combined together in a fluid-tight manner, and an open position in which they can be mutually moved apart; a vent member (5) suitable to enable the fluid under pressure to be released or prevent the fluid under pressure from being released, and at least one junction mechanism (14) to operatively connect the vent member (5) to the closing system (4), to lock the closing system (4) to the closed position when the vent member (5) is also in the closed position and preventing the opening of the closing system (4) when the vent member (5) is the closed position.

15 Claims, 5 Drawing Sheets

(56) References Cited

U.S. PATENT DOCUMENTS

| | | |
|---|---|---|
| 6,257,124 B1 * | 7/2001 | Chen .............................. 99/337 |
| 6,315,147 B1 * | 11/2001 | Bachmeier .................... 220/325 |
| 6,568,554 B2 * | 5/2003 | Booth et al. ................... 220/316 |
| 6,851,452 B2 * | 2/2005 | Smith .............................. 138/89 |
| 2004/0040186 A1 * | 3/2004 | Wilson ......................... 38/102.2 |
| 2006/0197344 A1 * | 9/2006 | Henry ........................... 285/420 |
| 2010/0219185 A1 * | 9/2010 | Griffin et al. ................. 220/4.07 |
| 2013/0081256 A1 * | 4/2013 | Richiuso et al. ........... 29/525.08 |

* cited by examiner

SAFETY DEVICE FOR CONTAINERS HOLDING FLUID UNDER PRESSURE

FIELD OF THE INVENTION

The present invention relates to a safety device for containers holding fluid under pressure, each having at least two units to be engaged with each other and defining an inner volume adapted to receive said fluid under pressure, the device comprising: a closing system defining a closed position in which the units are combined together in a fluid-tight manner, and an open position in which they can be mutually moved, and a vent member defining a closed position and a venting position of said fluid under pressure in said container, at least one junction mechanism adapted to operatively connect said vent member to the closing system, the junction mechanism being suitable to lock said closing system to the closed position when said vent member is in the closed position.

DESCRIPTION OF THE PRIOR ART

In particular, the device is adapted to avoid accidents or other problems resulting from an incorrect procedure in opening a container inside which there is a fluid under pressure and which is equipped with a removable quick-opening closure member.

In detail, the device can apply to a container or apparatus holding fluids which can be utilised in all plants involving use of equipment provided with a removable closure member, in particular industrial plants for producing enamels, paints, chemical and pharmaceutical products, foodstuffs, and intended for production of drinkable water, service or special waters for electronics.

It is known that presently these containers or apparatuses comprise a shell defining an inner volume inside which also suitable members intended for fluid treatment, such as filtering, can be disposed.

The shell is associated with ducts adapted to enable the fluid to enter and come out of said inner volume, and is provided with valves for stopping passage both of the incoming and outgoing fluid.

Finally, said shell consists of at least two elements that can be coupled, by a quick-action closure and opening operation, so as to define the inner volume, and in addition the two elements can be moved relative to each other in such a manner as to provide the operator with quick access to said inner volume for carrying out maintenance operations.

During maintenance, the operator causes working of suitable valves for stopping fluid passage and isolating the container from the rest of the system. Therefore, part of the fluid under pressure is inside the container and it is therefore indispensable that pressure should be released before opening the container or apparatus. In fact, an incorrect opening would cause a violent escape of the fluid remained inside the apparatus and/or of compressed air, if the apparatus has not been suitably purged during the starting step, and the fluid and/or the compressed air would strike on the operator causing physical damages to him/her.

There is also the possibility that the closure member, generally not permanently fastened to the container's tank, may be projected by the aforesaid compressed-air cushion onto the operator's body.

In addition, toxic gases are often present inside the apparatus and they can cause permanent damages to the operator's health.

The availability of safety means enabling the above mentioned danger situations to be avoided is therefore of the greatest importance.

For this reason, these apparatus are equipped with elements, such as vent members, enabling fluid at the inside of the apparatus to be removed so that they can be opened in a very safe manner.

In these cases the operator, once the fluid flow is stopped, opens the relief valve enabling the liquid and/or gas inside the apparatus to come out, so that pressure inside the fluid-holding apparatus is reduced.

Once pressure reaches the same values as the atmospheric pressure, the operator opens the shell safely and carries out maintenance operations.

The known art mentioned above has some important drawbacks.

In fact, in spite of the presence of safety systems, accidents due to incorrect execution and non-observation of the opening procedures are frequent. Actually, as time goes by, the operator acquires more confidence in his/her capacities and mastery of the machine, which will lead him/her to underestimate the dangers resulting from the machine itself.

Therefore the operator, for negligence, lack of care or too much confidence, does not observe the safety regulations and therefore opens the shell when pressure inside it is still high, which will result in dangers for the operator himself/herself. Finally, the above described dangers are still greater if the apparatus is of the quick-action closure and opening type.

SUMMARY OF THE INVENTION

Under this situation, the technical task underlying the present invention is to conceive a safety device for containers holding fluid under pressure provided with quick closure that is able to substantially obviate the mentioned drawbacks. Within the scope of this technical task, it is an important aim of the invention to conceive a device enabling the apparatus holding fluids to be exclusively opened when pressure inside it is the same as the atmospheric pressure.

It is therefore a further aim of the invention to avoid that, due to lack of attention or too much confidence, the operator may not respect the safety regulations.

The technical task mentioned and the aims specified are achieved by a safety device holding fluid under pressure as claimed in the appended claim 1. Preferred embodiments are highlighted in the sub-claims.

BRIEF DESCRIPTION OF THE DRAWINGS

The features and advantages of the invention are hereinafter clarified by the detailed description of preferred embodiments of the invention, with reference to the accompanying drawings, in which:

FIG. 3b shows a larger perspective view of the device in FIG. 3a;

FIG. 4b reproduces a perspective view of the device in FIG. 4a; and

DESCRIPTION OF THE PREFERRED EMBODIMENT

With reference to the drawings, the safety device according to the invention for containers holding fluid under pressure intended in particular for chemical and pharmaceutical plants, is generally identified with reference numeral 1.

In particular, the safety device 1 is adapted to prevent the operator from opening a container 2 when the fluid inside it is under pressure.

Therefore the device enables the rules established by the CE PED 97/23 Directive, addendum I art. 2.3 to be unequivocally observed, in which a directive requires that the opening of container 2 must be prevented by a mechanism authorizing the opening operation only when the residual pressure in the container is the same as the atmospheric pressure.

The safety device 1 is adapted to be preferably used in medium- and small-sized plants intended for treatment of paints, chemical products, foodstuffs, such as chemical and pharmaceutical plants.

In particular, the safety device 1 can be disposed on containers, tanks, filters or other similar elements equipped with a quick-opening system.

Therefore, device 1 can be disposed on containers 2 even when the same are provided with suitable fluid-treatment members. For instance, container 2 can consists of filtering apparatuses and the like.

Container 2 comprises an outer shell made up of at least two units 3 adapted to be coupled with each other in such a manner as to define an inner volume suitable to receive the fluid under pressure.

In addition, container 2 has a preferred extension direction 2a. Advantageously it is of cylindrical shape with at least one of the two portions in the form of a half-sphere. More specifically, at least the upper portion or cover or closure member is of hemispherical shape, or has a flatter form.

The safety device 1 is adapted to hermetically seal units 3 and to enable pressure of the fluid held in container 2 to be vented and/or released. For this reason it comprises a closing system 4 adapted to obtain said hermetically sealed closure and a vent or vent member 5 adapted to enable the fluid to get out of apparatus 2.

In particular, the closing system 4 defines a closed position in which it combines units 3 together in a fluid-tight manner and an open position at which it allows the operator to mutually move units 3.

The closing system 4 is of the quick-action shut type and in particular it is devoid of bolts for closing container 2 and can be manually operated by the operator without use of particular tools. Therefore, the closing system 4 comprises at least two sealing elements 6 and at least one locking device 7 adapted to fasten two of said sealing elements 6 to each other causing closure of container 2.

Preferably, the sealing elements 6 are two in number and advantageously have the shape of half a ring so that, once said sealing elements 6 are joined to each other they will surround the whole junction region between units 3.

Figure 2:
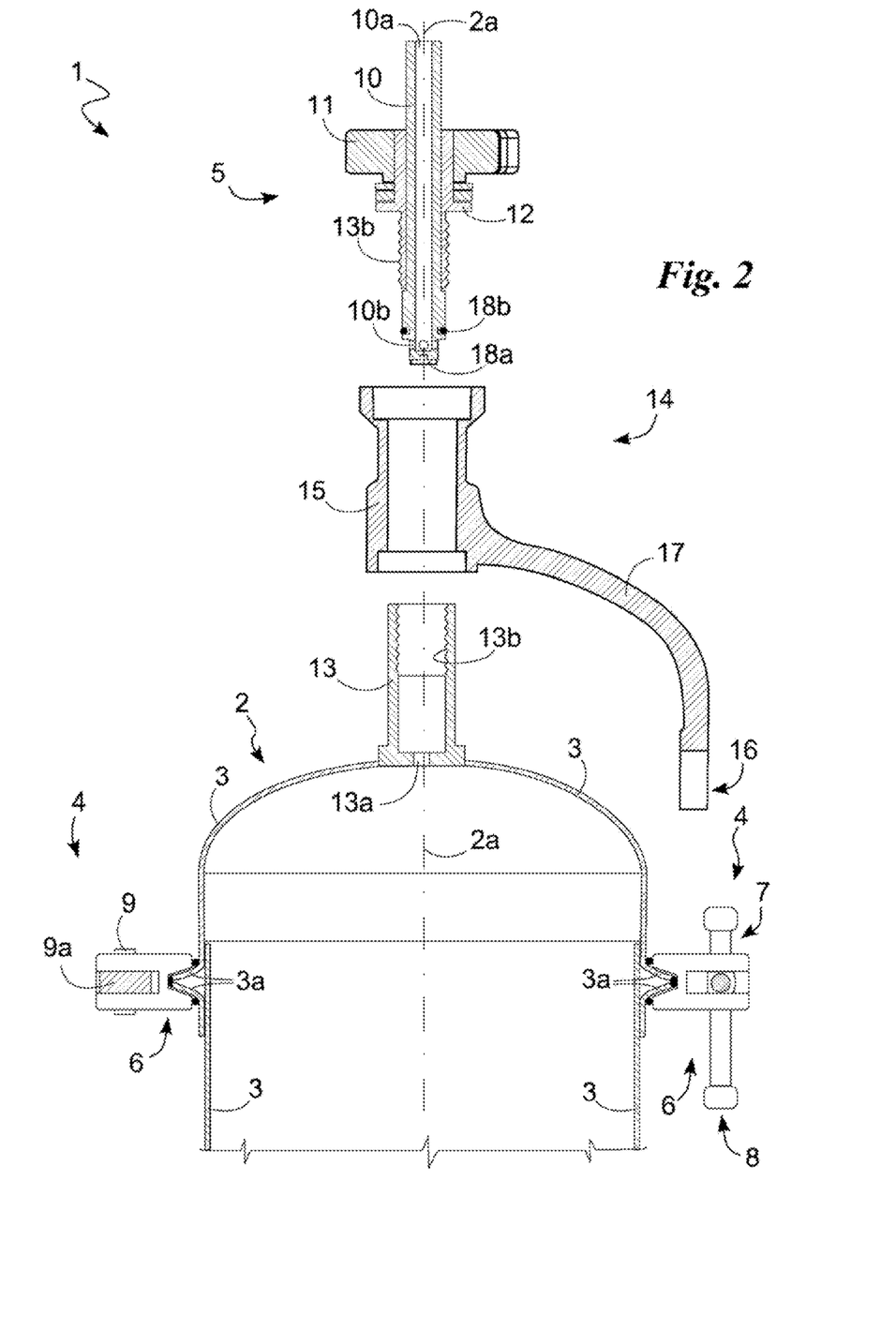
FIG. 2 is an exploded view of the device portion seen in FIG. 1.

Units 3 in the junction region advantageously have two wings 3a adapted to come into mutual contact when container 2 is closed and to be surrounded by the sealing elements 6, as shown in FIG. 2. Sealing elements 6 in the contact region with wings 3a have parts of elastomer or other similar material enabling hermetic sealing of the two units 3 to be obtained, once they are under pressure.

In addition, sealing elements 6 in the vicinity of each end have projections 6a to enable fastening of the sealing elements 6 themselves by the locking device 7. Locking device 7 suitably comprises an operating arm 8 adapted to connect and engage two sealing elements 6 with each other and a pin 9 located between projections 6a of a sealing element 6 and adapted to enable the operating arm 8 to rotate relative to said sealing element 6. Preferably, the rotation axis of arm 8 is almost parallel to direction 2a.

Figure 5:
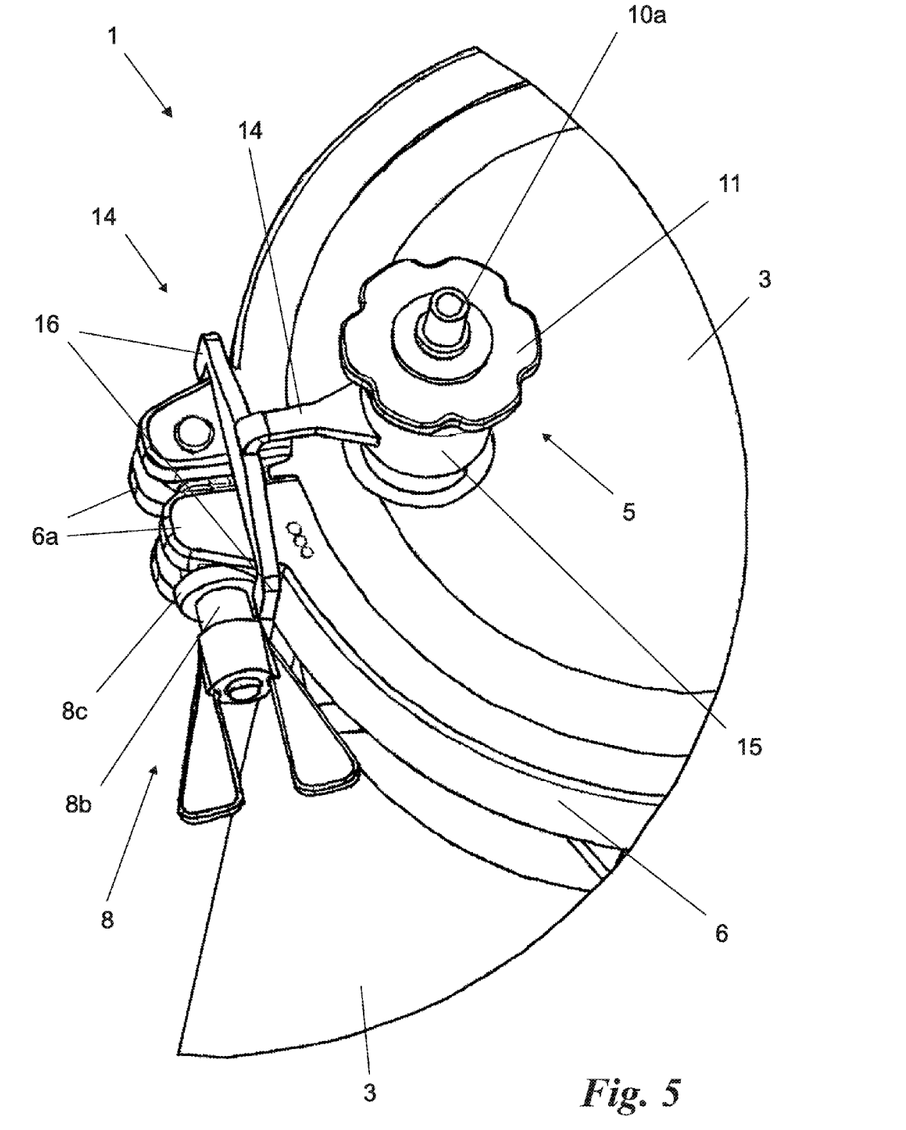
FIG. 5 is a variant of the device of the invention.

The operating arm 8 comprises components that are suitably connected to each other. Two of said components consist of a pivoting part 8a secured to pin 9 in a motion-admitting manner and a cylindrical part 8b adapted to create engagement between the sealing elements 6. Said parts 8a and 8b are further secured to each other by threading, to enable them to move close to and away from each other. The operating arm 8 further preferably comprises at least one flange 8c (FIG. 5) the central axis of which is parallel to the main axis of arm 8. Flange 8c is preferably in the shape of a ring coaxial with the cylindrical part 8b and having a diameter bigger than that of the cylindrical part 8b. This flange preferably is also adapted to exert pressure against the outer surface of projection 2.

The cylindrical part 8b advantageously has a frustoconical portion placed close to the pivoting element which portion is adapted to be fitted between the projections 6a of a second sealing element 6. In greater detail, due to threading, the cylindrical part 8b is adapted to move close to the pivoting part 8a forcedly fitting the frustoconical portion on projections 6a of the second sealing element 6, thus engaging the two sealing elements 6.

Figure 3A:
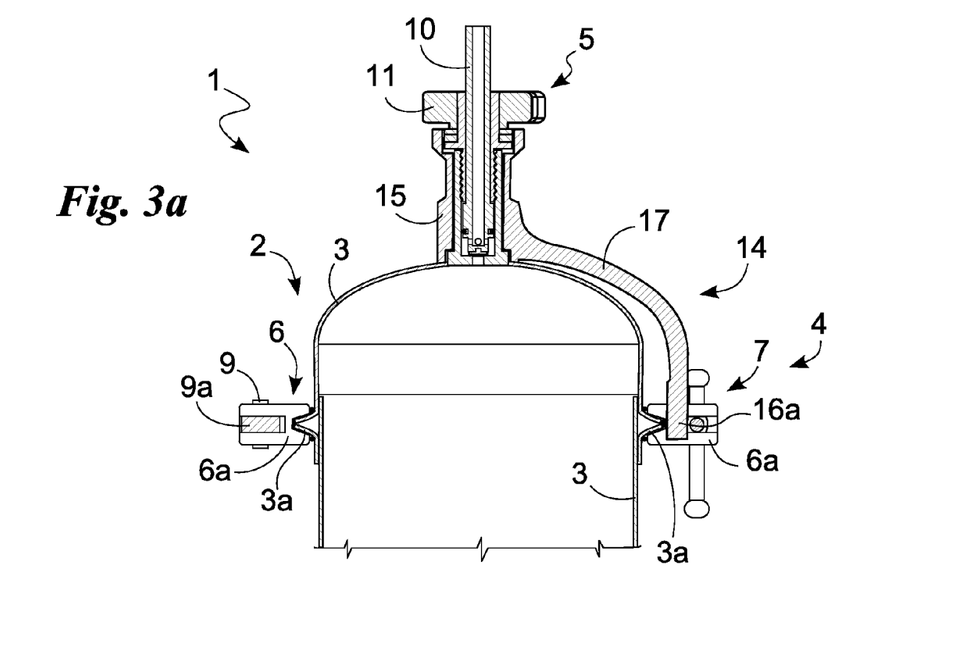
FIG. 3a is a sectional view of the device.
Figure 3B:
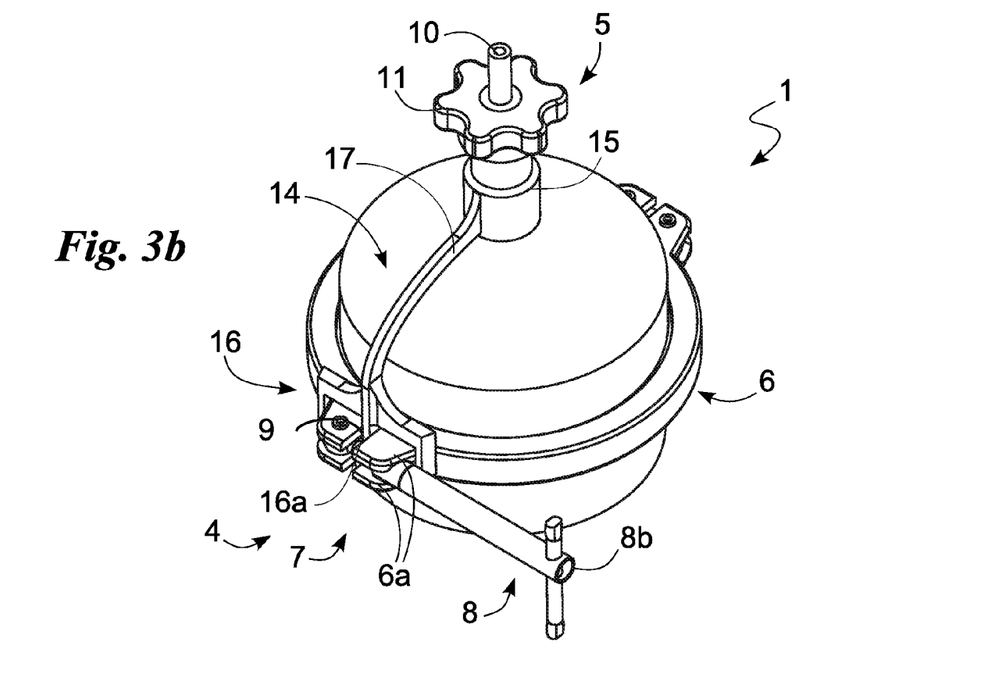
Figure 4A:
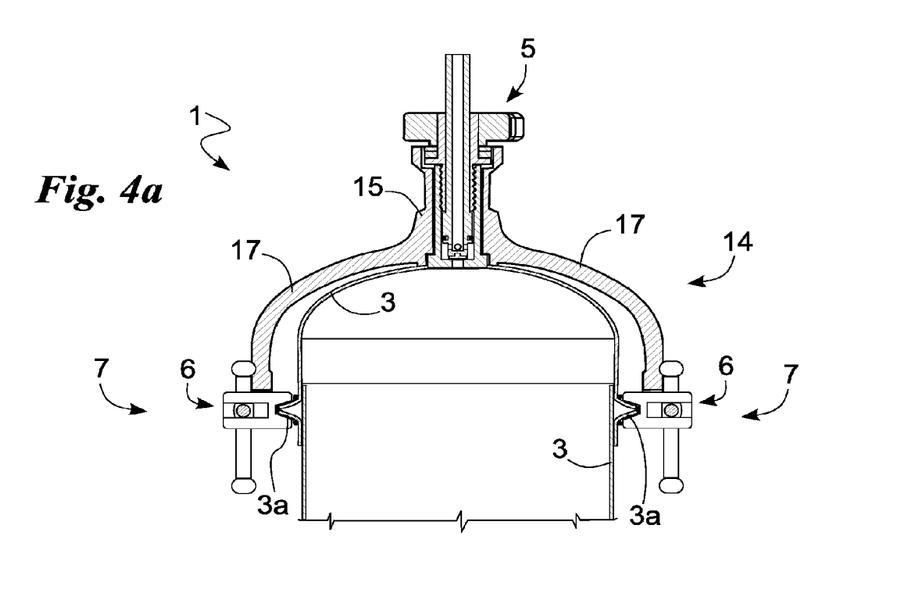
FIG. 4a is a sectional view of a further embodiment of the device.

The two sealing elements 6 can finally be provided with two locking devices 7 placed at the contact regions of the ends (see FIGS. 4a and 4b) or with a single locking device 7, as shown in FIGS. 3a and 3b.

In the last-mentioned case, sealing elements 6 have a plate 9a at one end, which plate is adapted to fasten sealing elements 6 to each other, while enabling them to carry out a rotation so that they will move close to and away from each other. The vent member 5 is advantageously disposed on the upper unit 3 and in particular, on top of the spherical cap of the upper base of container 2 which is advantageously provided with a hole enabling fluid escape.

Figure 1:
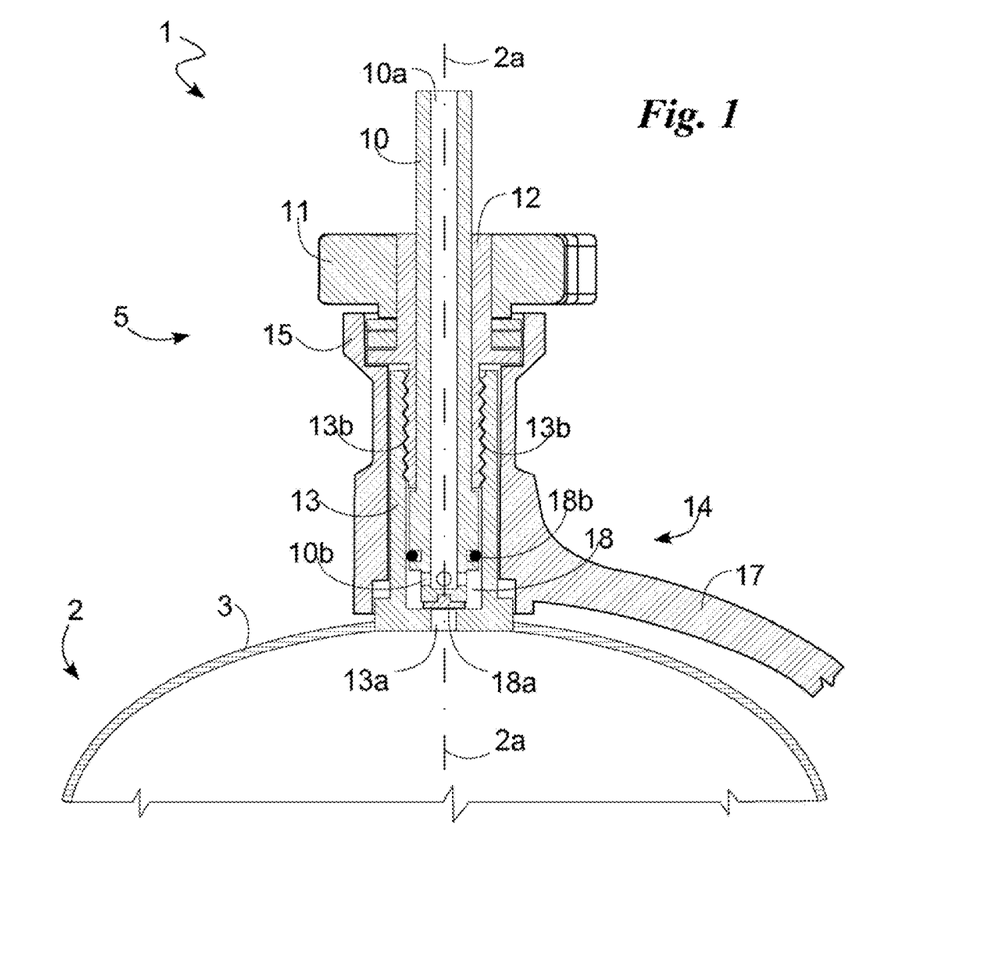
FIG. 1 shows a sectional view of a portion of the device according to the invention.

The vent member 5 defines a venting or release position in which the vent member 5 enables escape of fluid under pressure from container 2 and a sealing position in which vent member 5 prevents escape of said fluid from container 2. As shown in FIG. 1, it comprises a cylindrical duct 10 enabling escape of the fluid from container 2, an operating block 11 shaped at least partly as a knob, for operating opening and closure of vent member 5, a junction body 12 for connecting cylindrical duct 10 to the operating block 11, and a channel 13 adapted to at least partly contain the aforesaid elements. In particular, the cylindrical duct 10, operating block 11 and junction body 12 are mutually fastened by friction fitting or other technical solution adapted to rigidly connect them. Alternatively, the operating block 11 and body 12 are of one piece construction.

In detail, cylindrical duct 10 has an inner cylindrical cavity 10a that is blind and the axis of which is substantially coincident with direction 2a, and at least one transverse opening 10b substantially perpendicular to cylindrical cavity 10a and enabling said fluid to enter cylindrical cavity 10a.

To this aim, the inner portion of channel 13 is locally spaced apart from the outer surface of cylindrical duct 10, defining a region 18 for gas passage.

Channel 13 is fastened at the hole present in unit 3 and in turn has a hole 13a adapted to bring the inside of container 2 into connection for fluid passage with the transverse opening 10b and therefore cylindrical cavity 10a.

Finally, the vent member 5 is advantageously provided with one or more O-rings 18b or other sealing elements, preferably made of different elastomeric materials and, if necessary, of PFTE.

In particular, the closed end of cylindrical duct 10 that is fitted in channel 13 is provided, at hole 13a, with a sealing disc 18a made of PFTE.

Region 18 is then maintained in a sealed condition by the O-ring 18b placed over the transverse opening 10b and between channel 13 and cylindrical duct 10 and having an expanded portion substantially in contact with channel 13.

Finally, as shown in FIG. 2, channel 13 has an internally threaded portion 13b adapted to mesh with a externally threaded respective portion present on the junction body 12, so as to move body 12 in a direction substantially coincident with direction 2a. In detail, this threading enables body 12 to be locked so that the hermetic seal is obtained due to at least one of the sealing elements 18a and 18b, as better described in the following.

In some cases, this threading can have a particular profile so as to increase the sealing action obtained by one or more of said sealing elements.

In particular, threaded portion 13b is of a type not present on the market, so as to prevent tampering or closure by stoppers having a thread of the traditional type and the like. This is for the purpose of avoiding both tampering and elimination of the device.

The cylindrical duct 10, operating block 11 and junction body 12 are advantageously rigidly connected to each other and in particular are of one piece construction. Due to this solution, movement of the junction body 12 and therefore of cylindrical duct 10 can be controlled through the operating block 11. In particular, the operating block 11 drives body 12 in rotation, which body, due to threaded portion 13b, moves cylindrical duct 10 in a direction substantially parallel to the direction 2a.

Device 1 also comprises at least one junction mechanism 14 adapted to operatively connect the vent member 5 to the closing system 4.

In particular, mechanism 14 is adapted to enable opening of the closing system 4 exclusively after opening of vent member 5, i.e. after the fluid has come out of container 2.

The junction mechanism 14 preferably comprises a sleeve 15 adapted to be externally secured to vent member 5, at least one friction-fit means 16 placed at a system 4 and adapted to prevent undesirable opening of same, and at least one tailpiece 17 for combining the aforesaid two elements together.

Sleeve 15 is preferably of cylindrical shape the axis of which is almost coincident with that of the duct and is adapted to contain at least part of the vent member 5 and, in greater detail, it is adapted to contain at least part of channel 13.

In addition, advantageously, it has such a shape that it abuts against the operating block 11 or, alternatively, the junction body 12. In particular, sleeve 15 is adapted to abut on the lower face of body 12, as shown in FIG. 1 so that, when the vent member 5 is closed, the junction body 12 inhibits movements of the shell in a direction substantially parallel to direction 2a.

Figure 4B:
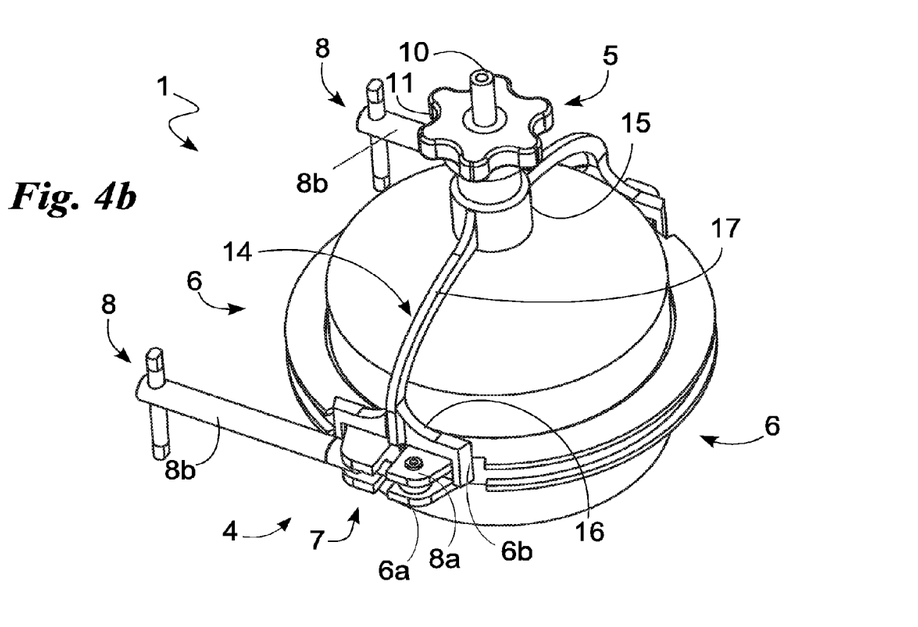

The friction-fit means 16 preferably has a C-shaped conformation so that it surrounds the projections of two sealing elements 6 when system 5 is in the closed position, as shown in FIG. 4b.

In addition, when the operating arm 8 comprises flange 8c (FIG. 5), the friction-fit means 16, in particular one of the arms thereof, is substantially in contact with flange 8c when system 4 is in the closed position. In this way the friction-fit means 16 inhibits opening of the operating arm 8 so as to prevent any even millimetric separation of said two sealing elements 6 when the closing system 4 is in the closed position.

Moreover, the friction-fit means 16, in order to enable a unique positioning on container 2, i.e. prevent incorrect positioning of same, can advantageously be provided with a peg 16a, shown in FIGS. 3a and 3b, adapted to be located between the projections 6a of two adjacent sealing elements 6 when the system is in the closed position 4.

If only one locking member 7 is present, the presence of plate 9a allows the wrong angular positioning of means 16 at the plate itself to be prevented. Alternatively, said unique positioning possibility can be obtained by means of suitable recesses 6b made in the vicinity of the projections 6a and adapted to partly receive means 16, as shown in FIG. 4b. In particular, recesses 6b have such a depth that they do not damage the closing system 4 capability of avoiding gas escapes, i.e. their depth does not prevent wings 3a from being devoid of covering, which would enable an undesirable fluid escape.

In fact, both solutions can be simultaneously used, i.e. device 1 can be provided both with recesses 6b and peg 16a.

Finally, tailpiece 17 joins sleeve 15 to the friction-fit means 16 making them integral with each other, i.e. mutually constraining their movements.

Preferably, tailpiece 17, sleeve 15 and friction-fit means 16 can be made as a single component.

The junction mechanism 14 is suitably provided with a number of friction-fit means 16 and tailpieces 17 equal to the number of the locking devices 7.

In particular, if the closing system 4 is provided with two locking devices 7, the mechanism has two friction-fit means 16 and two tailpieces 17.

Operation of the safety device 1 described above as to its structure is the following.

First, container 2 is closed, i.e. units 3 are brought into contact, moving them close to each other in the direction 2a, and are mutually fastened due to the closing system 4.

In greater detail, the sealing elements 6 of the closing system 4 are disposed close to wings 3a, i.e. wings 3a are placed inside them. At this point, using each operating arm 8, the adjacent projections 6a are moved close to each other, in a direction perpendicular to direction 2a, the two sealing elements 6 becoming mutually constrained.

When closure of unit 2 has been completed, the friction-fit means 16 is moved, in the direction 2a too, which means is disposed at the locking device in such a manner as to enclose the projections 6a of two adjacent sealing elements 6 and lock flange 8c. In particular, positioning of means 16 makes it advantageously interposed between the locking unit and sealing elements 6.

Finally, if peg 16a is present, the latter is placed between said projections 6a, while if the sealing elements 6 are provided with recesses 6b, the friction-fit means 16 is placed inside said recesses.

Due to this movement, sleeve 15 is allowed to be placed at the vent member 5 and more specifically sleeve 15 can be positioned in such a manner that it has part of channel 13 inside it.

At this point the vent member 5 is closed; through the operating block 11 and threaded portion 13b the junction body 12 is lowered so that it seals hole 13a through the sealing disc 18a. Through lowering of the junction body 12 for closure, sleeve 15 too is acted upon and the tailpiece 17 is lowered.

In greater detail, lowering of body 12 causes lowering of cylindrical duct 10 which will close hole 13a making container 2 hermetically sealed, thereby defining the closed position of the vent member 5. This is ensured by the advantageous presence of seals defined both by said disc 18a and the O-ring 18b placed between cylindrical duct 10 and channel 13. Seals 18a, 18b are preferably made of elastomer or PFTE.

Lowering of body 12 involves lowering of the junction mechanism 14 comprising sleeve 15, tailpiece 17, friction-fit means 16 and the optional peg 16a.

Thus, both movements of the junction mechanism 14 in a direction substantially parallel to direction 2a and any possible mutual moving apart of the sealing elements 6 in a way transverse to direction 2a are locked.

When the described operations have been completed, container 2 is safely closed and ready for use.

When container 2 has to be opened, the safety device 1 compels the operator to carry out the following series of operations: opening of the vent member 5, removal of the friction-fit means 16 and final unlocking of the closing system 4. In detail, first the vent member 5 is brought to the venting position by virtue of the operating block 11: the operating block 11 is rotated and, due to the presence of threaded portion 13b, it moves upwards together with body 12 and cylindrical duct 10.

Lifting of cylindrical duct 10 also causes lifting of the disc-shaped seal 18a and consequent opening of hole 13a. Thus the fluid in container 2 is allowed to outflow.

In detail, said fluid passes through hole 13a, enters cylindrical duct 10 through the transverse opening 10b, travels over cylindrical cavity 10a and comes out of container 2. Above all, lifting of the vent member 5 enables sleeve 15 and therefore the junction mechanism 14 to be raised. Raising however does not take place to such an extent as to allow immediate removal of the friction-fit means 16 from its housing and therefore does not enable the operator to open container 2 until unscrewing at the threaded portion 13b has reached a predetermined level.

Therefore the vent member 5 has sufficient time for carrying out an appropriate pressure release in container 2, before the latter can be opened.

Once pressure inside container 2 is substantially equal to the ambient pressure, the fluid flow coming out of the vent member 5 stops and therefore opening of container 2 can take place.

First of all it is necessary to carry out removal of the junction mechanism 14. By suitably rotating the operating block 11, the junction body 12 is fully unscrewed until the end of its stroke, along axis 2a, i.e. until full disengagement of body 12 from threaded portion 13b.

When this operation has been completed, the vent member 5 is removed so that sleeve 15 integral with the junction mechanism 14 is made free.

The mechanism 14 is shifted upwards enabling the friction-fit means 16 to come out of its seat and flange 8c is disengaged. In greater detail, the junction mechanism 14 is shifted in a direction parallel to direction 2a, allowing the friction-fit means 16 to come out of its seat and subsequently the closing system 7 is removed and opening of container 2 can take place.

At the end of this operation, opening of the closing system 4 has occurred. In detail, the operating arm 8 is rotated, as flange 8c is open, and therefore the frustoconical portion is adapted to come out of projections 6a enabling the operating arm to rotate thus releasing the sealing elements 6.

Ultimately, the sealing elements 6 are moved away from units 3 and it is therefore possible to open the holding apparatus.

The invention allows achievement of important advantages.

In fact, device 1 prevents the operator from opening container 2 without having first reduced pressure within the container itself.

Therefore, even if the operator is absent-minded or other troubling factors are present, since he/she must follow the above-described opening procedure, container 2 can only be opened in a safe manner.

In fact, due to the presence of mechanism 14 he/she is obliged to decrease pressure in container 2 through device 5 and only afterwards the closing system can be removed. In addition, a few-millimeter-opening of the two sealing elements 6 or even less is also impossible due to the presence of flange 8a that at the opening would interfere with the friction-fit means 16.

Moreover, provision of peg 16a and recesses 6b allows angular positioning of the locking device exclusively in the correct location. In particular, in case of a single locking device 7, the junction mechanism 14 can be disposed in a unique position also due to the presence of plate 9a.

Due to the particular threaded portion 13b and to the fact that a single mounting position exists, tampering of device 1 and therefore incorrect use of same can be avoided.

A further advantage resides in the possibility of starting the plant in a completely safe condition due to the advantageous presence of device 1. In fact, the apparatus is obviously vented before starting.

The invention is susceptible of variations falling within the scope of the inventive idea.

All of the details can be replaced by equivalent elements and the materials, shapes and sizes can be of any nature and magnitude.

The invention claimed is:

1. A safety device (1) for containers (2) holding fluid under pressure, each container having at least a upper component (3) and a bottom component (3) to be engaged with each other and defining an inner volume adapted to receive said fluid under pressure, said safety device comprising:
    a closing system (4) defining a closed position in which said components (3) are engaged together in a fluid-tight manner, and an open position in which they can be mutually moved and separated,
    a vent member (5) defining a closed position and a venting position of said fluid under pressure inside the container (2),
    at least one junction mechanism (14) to operatively connect the venting member (5) to the closing system (4), wherein the junction mechanism (14) is able to lock the closing system (4) to the closed position only when the vent member (5) is in the closed position; wherein the closing system (4) comprises at least two sealing elements (6), adapted to mutually seal both upper and bottom components (3) of the container (2), and an operating arm (8) designed to mutually engage and join together two sealing elements (6); and wherein said sealing elements (6) have the shape of half a ring so that, when two sealing elements (6) are joined together at protuberances (6a) on said sealing elements (6), and said sealing elements (6) are mounted on a rib (3a) that surrounds externally the whole circumference of the upper component (3) they achieve a close position of the container (2).

2. The safety device (1) according to claim 1, wherein said upper and bottom components (3) are engaged together along a vertical direction (2a) perpendicular to a circumference defined by the sealing elements (6).

3. The safety device (1) according to claim 1, wherein said junction mechanism (14) is mounted in a perpendicular direction relative to a circumference defined by the sealing elements (6).

4. The safety device (1) according to claim 1, wherein said closing system (4) is of the quick-action shut type without an operator's need of using any tool to operate the closing system (4).

5. The safety device (1) according to claim 1, wherein said junction mechanism (14) comprises:
- a sleeve (15) mounted around a channel (13) on which the vent member (5) is mounted;
- at least one friction-fit means (16) positioned at the closing system (4),
- at least one tailpiece (17) permanently connected on one side to the sleeve (15) and to the friction-fit means (16) on the other side; wherein the friction-fit means (16) has a "C" shape to surround protuberances (6a) of the sealing elements (6) to keep them joined together in a locked position only when the vent member (5) is also in a closed position.

6. The safety device (1) according to claim 5, wherein said junction mechanism (14) prevents the operating arm (8) to achieve the opening of the closing system (4) when the venting member (5) is currently in a closed position.

7. The safety device (1) according to claim 5, wherein said friction-fit means (16) is substantially in contact with a flange (8c) to prevent the rotation of the operating arm (8) when the closing system (4) is in a closed position.

8. The safety device (1) according to claim 5, wherein said vent member (5) comprises an operating knob (11) whose clockwise rotation moves said vent member (5) in a closed position and make the sleeve (15) in contact with the container (2) to mechanically prevent the separation of the upper component (3) from the bottom component (3) of the container (2) and concurrently locks the closing system (4) to a closed position by lowering the junction mechanism (14) which comprises the friction-fit means (16) that locks together the sealing elements (6) and prevents the rotation of the operating arm (8) to unlock the closing system (4) to an open position.

9. The safety device (1) according to claim 8, wherein said operating knob (11) whose counter-rotation moves the venting member (5) upward to a venting position to unseal a hole (13a) by lifting a sealing disk (18a) to allow the pressure inside the container (2) to escape through an inner cylindrical cavity (10a) of a cylindrical duct (10) and enables an upper movement of the sleeve (15), an attached tailpiece (17) and an attached friction-fit means (16) to allow the closing system (4) to move to an open position by causing the unlocking of the sealing elements (6) by turning the operating arm (8), now rotatable.

10. The safety device (1) according to claim 1, wherein the operating arm (8) has a cylindrical part (8b) and comprises at least one flange (8c) in a shape of a ring having a central axis parallel to the main axis of the operating arm (8) and having an internal diameter greater than the diameter of the cylindrical part (8b); wherein the flange (8c) is in contact with an internal side of a friction-fit means (16) to disallow an unscrewing action of the operating arm (8); and wherein the cylindrical part (8b) has a frustoconical portion and a threaded portion at one of its ending side which is screwed inside a threaded pivoting part (8a), mounted between protuberances (6a) of one of the sealing element (6); and wherein said two sealing elements (6) are locked by being joined together whenever the cylindrical part (8a) is rotated and its threaded part is further inserted into the threaded pivoting part (8a) causing the frustoconical part on the cylindrical part (8b) to force fitting into a frustoconical part of the protuberances (6a) of a second sealing element (6).

11. The safety device (1) according to claim 1, wherein said junction mechanism (14) comprises a friction-fit means (16) and one tailpiece (17) for each operating arm (8) that the closing system (4) is provided with.

12. The safety device (1) according to claim 11, wherein at least one of said friction-fit means (16) is positioned on top of two sealing elements (6) joined together using a peg (16a) inserted to prevent the friction-fit means (16) to be positioned incorrectly, said peg (16a) is suitable to be fitted between two sealing elements (6) only when the vent member (5) is in a closed position and the closing system (4) is also in a closed position.

13. The safety device (1) according to claim 12, wherein two sealing elements (6), consecutive to each other and in mutual engagement on rotation, said two sealing elements (6) are joined together by a junction plate (9a); and wherein each sealing elements (6) is pivoting around a pin (9) mounted between two protuberances (6a) of each sealing elements (6).

14. The safety device (1) according to claim 1, wherein said two sealing elements (6), when joined together, form a recess (6b) for receiving a friction-fit means (16) when the vent member (5) is in a closed position and the closing system (4) is also in a closed position.

15. The safety device (1) according to claim 1, whenever said vent member (5) comprises:
- a junction body 12 of cylindrical shape having a threaded external portion (13b);
- a cylindrical duct (10) mounted inside it;
- an operating knob (11) mounted on the external side of a junction body (12);
- an O-ring (18b) to insure pressure sealing between a channel (13) and said junction body (12);
- a sealing disk (18a) to seal a hole (13a) of the sleeve (15) to prevent the pressure inside the container (2) to be vented when the vent member (5) is in a closed position;

and wherein said junction body (12), the cylindrical duct (10) and the operating knob (11) are permanently fastened together to form one piece; and wherein the vent member (5) is screwed inside the threaded portion of the channel (13) of cylindrical shape, permanently attached to the top of the upper element (3) of the container (2); said channel (13) has a hole (13a) on its base in communication with the inside of container (2) and has a threaded portion (13b) on its inside surface to be coupled a respective external threaded portion (13b) of the junction body (12) by way of the rotation of the operating knob (11) to attain a closed position when the sealing disk (18a) is closing sealed the hole (13a) of the channel (13).

* * * * *